US005248365A

United States Patent [19]

Kamioka et al.

[11] Patent Number: 5,248,365

[45] Date of Patent: Sep. 28, 1993

[54] METHOD FOR PASSING AND BONDING A CABLE THROUGH AND TO AN INNER WALL OF A CRYOSTAT

[75] Inventors: Yasuharu Kamioka; Shigeru Yoshida; Tomonobu Sano, all of Tokyo, Japan

[73] Assignee: Toyo Sanso Co., Ltd., Tokyo, Japan

[21] Appl. No.: 794,408

[22] Filed: Nov. 19, 1991

[30] Foreign Application Priority Data

Nov. 21, 1990 [JP] Japan .................. 2-317403

[51] Int. Cl.[5] .................. B32B 31/00

[52] U.S. Cl. .................. 156/256; 156/235; 156/293; 62/51.1

[58] Field of Search .................. 156/256, 293; 29/235; 62/51.1

[56] References Cited

U.S. PATENT DOCUMENTS 4,773,228 9/1988 Murai et al. .................. 62/51.1

4,856,297 8/1991 Yasue .................. 62/51.1

4,986,077 1/1991 Saho et al. .................. 62/51.1

*Primary Examiner*—Robert A. Dawson

*Assistant Examiner*—David Reifsnyder

*Attorney, Agent, or Firm*—Oliff & Berridge

[57] ABSTRACT

The present invention provides a method for passing a flat polyimide film cable as a communication cable (signal line) to a specimen through the inner wall made of FRP material and the outer wall of the cryostat for cooling a specimen such as, for example, a semiconductor operated in cryogenic liquid such as liquefied helium, particularly a method for passing the cable through the inner wall and sealing it thereto. A slit is provided in advance in the inner wall and an FRP layer is formed in advance on both surfaces of the polyimide film cable along distance sufficiently larger than the thickness of the inner wall, then the polyimide film cable provided with the FRP layer is passed through the slit so that part of the FRP layer is positioned inside the slit and the surface of the FRP layer and the internal surface of the slit are bonded and sealed with the adhesive.

5 Claims, 3 Drawing Sheets

METHOD FOR PASSING AND BONDING A CABLE THROUGH AND TO AN INNER WALL OF A CRYOSTAT

BACKGROUND OF THE INVENTION

The present invention relates to a cryostat for cooling and holding a specimen with an extremely low temperature liquefied gas such as liquefied helium to carry out various cryogenic experiments and measurements of such specimens as semiconductor materials, metallic materials or various kinds of elements, particularly a method for bonding a cable to a slit and sealing the slit in a work for passing the cable for the specimen through the inner wall of the vessel in the cryostat which has the inner wall made of fiber reinforced plastics (FRP).

Lately, along with an advancement of cryogenic science, the opportunities of cryogenic measurements and experiments are increasing to investigate cryogenic characteristics and behaviors of various materials and elements for semiconductors and other devices. In the cryogenic testing equipment for these measurements and experiments, specimens are usually cooled and held at a specified low temperature with a low temperature liquefied gas called cryogenic liquid such as liquefied helium or nitrogen, and such cooling equipment is generally referred to as the "cryostat".

This cryostat is primarily classified into an immersion type in which the specimen is directly immersed for cooling into cryogenic liquid and a thermal conduction type in which the specimen is indirectly cooled by thermal conduction without immersing into cryogenic liquid. In case of the latter thermal conduction type cryostat which employs the indirect cooling method, it is often difficult to fully cool the specimen to a cryogenic liquid temperature due to heat-in-leak and heat generation from the specimen. Therefore, the former immersion type cryostat is more advantageous in view of the temperature margin.

An example of the conventionally typical immersion type cryostat is shown in FIG. 4.

In FIG. 4, the cooling vessel 2 having the cryogenic liquid vessel 1 has a double-wall construction made up of the inner wall 3 and the outer wall 4 with the vacuum thermal insulation space 5 interposed therebetween. The specimen 6 is held at the extreme end of the pipe-shaped support member 8 extended from the top flange 7 and immersed into the cryogenic liquid 9 contained in the vessel 1. The signal line 10 for transmitting the signals between the specimen 6 and an electronic circuit of equipment (not shown) is guided from the specimen 6 to the top flange 7 through the inside of the support member 8 and out of the cryostat.

In such conventional immersion type cryostat, since the specimen 6 is suspended from the top flange 7 and immersed in the cryogenic liquid 9, the signal line is led out through the support member 8 for suspending the specimen as described above and therefore the length of the signal line 10 is larger than the depth of the cryogenic liquid vessel 1 of the typical cryostat which is usually longer than one meter. If the signal line is long as described above, the transmission of a signal from the specimen to the electronic circuit of the external equipment may be delayed for a time proportioned to the length of the signal line and a system using high speed devices will not function satisfactorily. For example, if an experiment or a measurement of the Josephson device which has an important feature of high speed operation and has lately been noted, is conducted with the conventional immersion type cryostat, there will be a problem that the transmission of signals will be delayed due to a long signal line and the high speed response of the whole system will therefore deteriorate.

A method to shorten the signal line from the specimen in the immersion type cryostat is to lead the signal line from the specimen to the outside across the vacuum thermal insulation space. The present inventors have already proposed the cryostat disclosed in the Utility Model Application KOKAI No. 3-564 as one of the immersion type cryostat having the above construction.

The cryostat proposed as above is characterized in that it basically comprises the upper vessel which is sealed with the top flange at its upper end and open at its bottom and the lower vessel which is remountably fitted to the lower part of the upper vessel to form, in conjunction with the upper vessel, the cryogenic liquid vessel. The upper vessel and the lower vessel have, respectively, a double-wall construction consisting of the inner and outer walls, the vacuum thermal insulation space is independently provided between the inner wall and the outer wall of the upper vessel and between the inner wall and the outer wall of the lower vessel. The lower vessel is provided with the specimen holding part for holding the specimen which is kept exposed in the cryogenic liquid vessel.

A practical example of the above proposed cryostat is shown in FIG. 5.

In FIG. 5, the upper vessel 20, which is formed to be hollow and cylindrical as a whole, is made to have a double-wall construction with the inner wall 21 and the outer wall 22 and provided with the vacuum thermal insulation space 23 between the inner wall 21 and the outer wall 22. The top flange 24 is remountably fitted with a bolt 25 to the upper end of the upper vessel 20 and the clearance between the top flange 24 and the upper surface of the upper vessel 20 is sealed with a sealing member 26 such as an O-ring. The top flange 24 is provided with the inlet port 28 for supplying cryogenic liquid 9 such as liquefied helium and the outlet port 29 for discharging a vaporized gas. The bottom of the upper vessel 20 is made open. The flange 30 is formed integral with the external periphery of the upper vessel 20 at a position as high as the specified distance l from the lower end.

On the other hand, the lower vessel 31 has a double-wall construction formed with the inner wall 32 and the outer wall 33 and is provided with the vacuum thermal insulation space 34 between the inner wall 32 and the outer wall 33. This lower vessel 31 comprises a large-diameter cylindrical part 31A which surrounds the lower part of the upper vessel 20, that is, the part corresponding to the distance l below the flange 30 and the rectangular parallel-piped part 31B which is integrally continued to the lower part of the large-diameter cylindrical part 31A and the bottom of the rectangular parallel-piped part 31B is closed. A pedestal type specimen holder 35 is formed on the internal bottom surface of the rectangular parallel-piped 31B. The upper end surface of the lower vessel 31 and the flange 30 of the upper vessel 20 are jointed with bolts 36 and the clearance between the upper surface of the lower vessel 31 and the flange 30 of the upper vessel 20 is sealed with the sealing member 37 such as the O-ring. The lower vessel 31 is supported by the base 38 and the support 39.

The cryogenic liquid vessel which stores the cryogenic liquid 9 such as liquefied helium is formed by the internal surfaces of the upper vessel 20 and the lower vessel 31 as described above. The specimen 6 is held on the specimen holder 35 and directly exposed to cryogenic liquid 9. The signal line 10 from the specimen 6 is led out of the rectangular parallel-piped part 31B of the lower vessel 31 through the inner wall 32, vacuum thermal insulation space 34 and outer wall 33 and connected to the external terminal 40 provided on the base 38.

In such an immersion type cryostat, the signal line 10 for transmitting and receiving the signals between the specimen 6 and the external equipment can be led out from the specimen holder 35 in the lower vessel 31 through the inner wall 32, vacuum thermal insulation space 34 and the outer wall 33 of the lower vessel 31. The delay in transmission of the signals depending on the length of the signal line 10 can be reduced by shortening the length of the signal line 10.

In the above proposed cryostat, the upper vessel 20 is separated from the lower vessel 31 when replacing the specimen. In this case, the vacuum thermal insulation space 23 of the upper vessel 20 and the vacuum thermal insulation space 34 of the lower vessel 31 are independent and therefore these vacuum thermal insulation spaces can maintain the vacuum condition. Accordingly, evacuation is not required after replacing the specimen and the working time can be substantially reduced. Since the vacuum thermal insulation space 23 of the upper vessel 20 and the vacuum thermal insulation space 34 of the lower vessel 31 are independent one from another, the vacuum sealing part is not required for the cryogenic position and the vacuum sealing work for the cryogenic position need not be carried out when bonding the upper vessel 20 and the lower vessel 31 after replacing the specimen.

In addition, the capacity of the cryogenic liquid vessel 1 can be increased by expanding the upper vessel 20. In case the upper vessel 20 is separated from the lower vessel 31, the setting and removal of the specimen 6 on and from the specimen holder 35 of the lower vessel 31 can be performed extremely easily by hand. Since the length of the upper vessel 20 has nothing to do with the operational efficiency in replacement of the specimen, the capacity of the crogenic liquid vessel 1 can be changed as required without deteriorating the operational efficiency in replacement of the specimen.

For the cryostats for use in measurements of magnetic characteristics, generally, non-magnetic materials are appropriate as constructional materials such as the inner and outer walls of the upper and lower vessels and a non-magnetic FRP has lately been often used as such non-magnetic materials. Glass fiber and epoxy resin are generally used as materials of the FRP. It is preferable to use, as the signal line (cable) for transmission of signals between the specimen inside the cryostat and external equipment, a flat tape type cable which is insulation-covered with a polyimide film (polyimide film cable) for cryogenic resistance as to mechanical characteristics and heat-in-leak through the cable. A method for passing and fixing such polyimide film cable through the inner and outer walls made of FRP material of the cryostat is usually, as shown in FIGS. 6 and 7, such that, for example, a slit 50 is formed in the inner wall 23 made of FRP, the polyimide film cable 51 is passed through this slit 50 and bonded to the internal surface of slit 50 with an epoxy adhesive 52 and simultaneously the slit 50 is sealed with this adhesive. However, this method has a problem as described below.

Specifically, the bonding area of the inner wall is inevitably small because of its thin thickness of approximately 3 mm in general and polyimide is a stable substance with inferior adhesiveness to other materials. Therefore, if a cryogenic liquid is transferred into the cryogenic liquid vessel of the cryostat and the bonded part (sealed part) of the polyimide film cable 51 and the slit 50 of inner wall 32 is cooled, the bonded part is prone to be cracked by a thermal stress produced. Particularly, an extremely large thermal stress takes place at the bonded part on the inner wall due to rapid cryogenic cooling and cracks as described above are apt to occur. Though the inner wall keeps the internal cryogenic liquid away from the external vacuum thermal insulation space, the cracks which have occurred in the bonded part of the polyimide film cable as described above will cause the cryogenic liquid to leak into the vacuum space and the liquid to vaporize, and the vacuum of the thermal insulation space will deteriorate, thus rendering the cryostat unusable. For these reasons, in case of the cryostat made according to the prior art, the service life of its bonded and sealed part is extremely short and the cryostat can be used for operation only once or twice and therefore the cryostat has been disposed after each cryogenic operation.

From a further micro investigation as to the position where cracks have occurred in the bonded part of the polyimide film cable, it is clarified that cracks are not found in the boundary between the bond layer 52 and internal surface of slit 50 of the inner wall and all cracks were found in the boundary between the polyimide film cable 51 and the bond layer 52. From this fact, it is known that the bonding strength at the boundary between the internal surface of the slit of the FRP inner wall and the adhesive layer is sufficient but the bonding strength at the boundary between the polyimide film cable and the bond layer is insufficient when the polyimide film cable and the internal surface of the slit of the FRP inner wall are bonded and sealed with adhesive.

In case of the conventional method as previously described, air bubbles may be included in the adhesive when the polyimide film cable is inserted through the slit and the adhesive is applied or the adhesive may drool from the slit and the slit may not be fully filled with the adhesive. These problems have been a cause of insufficient bonding strength or a cause of gas leakage at an early stage. Though degassing or pressurization when applying the bond to the bonding part can be performed to prevent these problems, the cryostat itself has a large diameter and such degassing and pressurization have been actually impossible.

SUMMARY OF THE INVENTION

The primary object of the present invention is to solve the the above described problems found in the method for passing a polyimide film cable through a low temperature inner wall and bonding it to the slit of the inner wall of the immersion type cryostat. The method of the present invention presents a vacuum leakage from a bonded (sealed) part by providing a sufficient bonding strength of the polyimide film cable for the inner wall where the slit is formed. Therefore, the service life of the cryostat can thus be substantially extended farther than the conventional cryostat.

The present invention specifies that;

in a cryostat in which a vacuum thermal insulation space is formed between an inner wall and an outer wall of a vessel body which is made to have a double-wall construction, at least the inner wall of these inner and outer walls being made of FRP material and the inside of the inner wall being used to form a cryogenic liquid vessel, and a specimen holder for holding a specimen, which is kept exposed to cryogenic liquid, is provided at a lower part of the cryogenic liquid vessel, a method for passing a flat polyimide film cable, as a signal line which is led out from the specimen holder via the inner and outer walls, through the inner wall and bonding it to the passing part comprises:

forming a slit for passing the polyimide film cable in the inner wall, forming an FRP layer along a distance longer than the thickness of the inner wall on both wide surfaces of the polyimide film cable, passing the polyimide film cable through the slit and positioning part of the FRP layer in the slit along with the polyimide film cable, and bonding the internal surface of the slit and the FRP layer and sealing the bonded part with adhesive.

PREFERRED EMBODIMENT OF THE INVENTION

Figure 1:
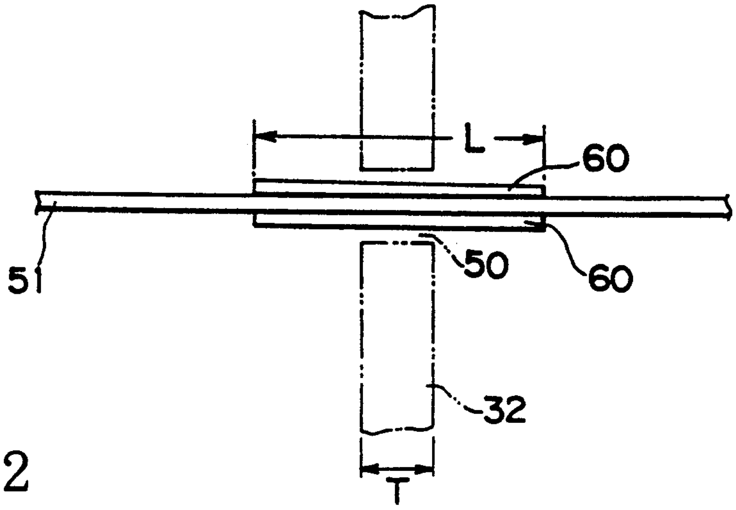
FIG. 1 is a side view showing an example of the polyimide film cable on which the FRP layer is formed at both sides for an embodiment of the method in accordance with the present invention.

In accordance with the present invention, an FRP layer is formed in advance (in the stage before setting the film cable to be passed through the slit of the inner wall) on both wide surfaces of the polyimide film cable so that the FRP layer formed on the polyimide film cable is passed through the inner wall and extended along a distance substantially larger than the thickness of the inner wall. In this case, the bonding strength per unit area of the bonding surfaces of the FRP layer and the polyimide film cable is as small as that of the bonding surfaces of the polyimide film cable and the adhesive layer described as to the prior art. However, the area of the boundary surface between the FRP layer and the polyimide film cable according to the present invention is not limited by the thickness of the inner wall and therefore the area of the boundary surface between the FRP layer and the polyimide film cable can be sufficiently increased and the bonding strength at the boundary surface can also be sufficiently increased by increasing the length of the FRP layer to a length sufficiently longer than the thickness of the inner wall.

Thus, the polyimide film cable provided with the FRP layer at the specified position is passed through the slit of the inner wall to position a part of the FRP layer in the slit and the internal surface of the slit and the FRP layer are bonded and sealed with adhesive. In this case, since an FRP material is used both in the FRP layer and in the inner wall provided with the slit through which the FRP layer is passed, a sufficiently large bonding strength per unit area of the boundary between the above described FRP layer and the internal surface of the slit can be obtained. The strength is the same as at the bonding surface between the adhesive layer and the internal surface of the slit of the FRP inner wall in case of the prior art.

As described above, the method in accordance with the present invention allows to substantially increase the bonding strength at the boundary between the polyimide film cable and the FRP layer by expanding the area of the FRP layer to increase the bonding area (the area of the boundary) and a sufficient bonding strength is obtained as is at the boundary between the FRP layer and the adhesive layer and the boundary between the adhesive layer and the internal surface of the slit of the FRP inner wall. Accordingly, a sufficient bonding strength as a whole can be obtained between the polyimide film cable and the slit of the FRP inner wall.

Accordingly, even though a thermal stress which is produced during cooling down of the inner wall by the cryogenic liquid is applied to the polyimide film cable passing and bonding part, a vacuum leak of gas through cracks due to the thermal stress can be effectively prevented. Even if fine cracks locally occur at the boundary between the FRP layer and the polyimide film cable, a possibility of vacuum leak through such local fine cracks is small since the area of the boundary surface between the FRP layer and the polyimide film cable is large regardless of the thickness of the inner wall.

Since a process for forming the FRP layer on the surface of polyimide film cable precedes insertion of the polyimide film cable into the slit of the inner wall of the cryostat, the method in accordance with the present invention allows provision of the FRP layer without any restriction to the dimensions and shape of the cryostat body. Therefore, when the FRP layer is formed, for example, by bonding an FRP material to the surface of polyimide film cable with adhesive or by bonding fibers to the surface of polyimide film cable with adhesive and, at the same time, impregnating the adhesive into fibers (FRP forming process), such bonding work (or bonding and FRP forming process) can be carried out while degassing in vacuum or applying a pressure. In this case, an inclusion of air bubbles in the boundary between the FRP layer and the polyimide film cable and the FRP layer can be prevented and the adhesive can be prevented from drooling. Consequently, the deterioration of the bonding strength of the polyimide film cable and the FRP layer resulting from inclusion of air bubbles and drooling of the bond can be prevented.

The method in accordance with the present invention is practically described in detail in the following.

The jointing method specified by the present invention applies, in particular, to a process for passing the polyimide film cable as the signal line 10 through the inner wall 32. For example, the polyimide film cable is used as the signal line 10 which is to be led out of the cryostat from the specimen holder 35 inside the inner wall 32 through the FRP inner wall 32 and the outer wall 33 in the cryostat as shown, for example, in FIG. 5.

Figure 5:
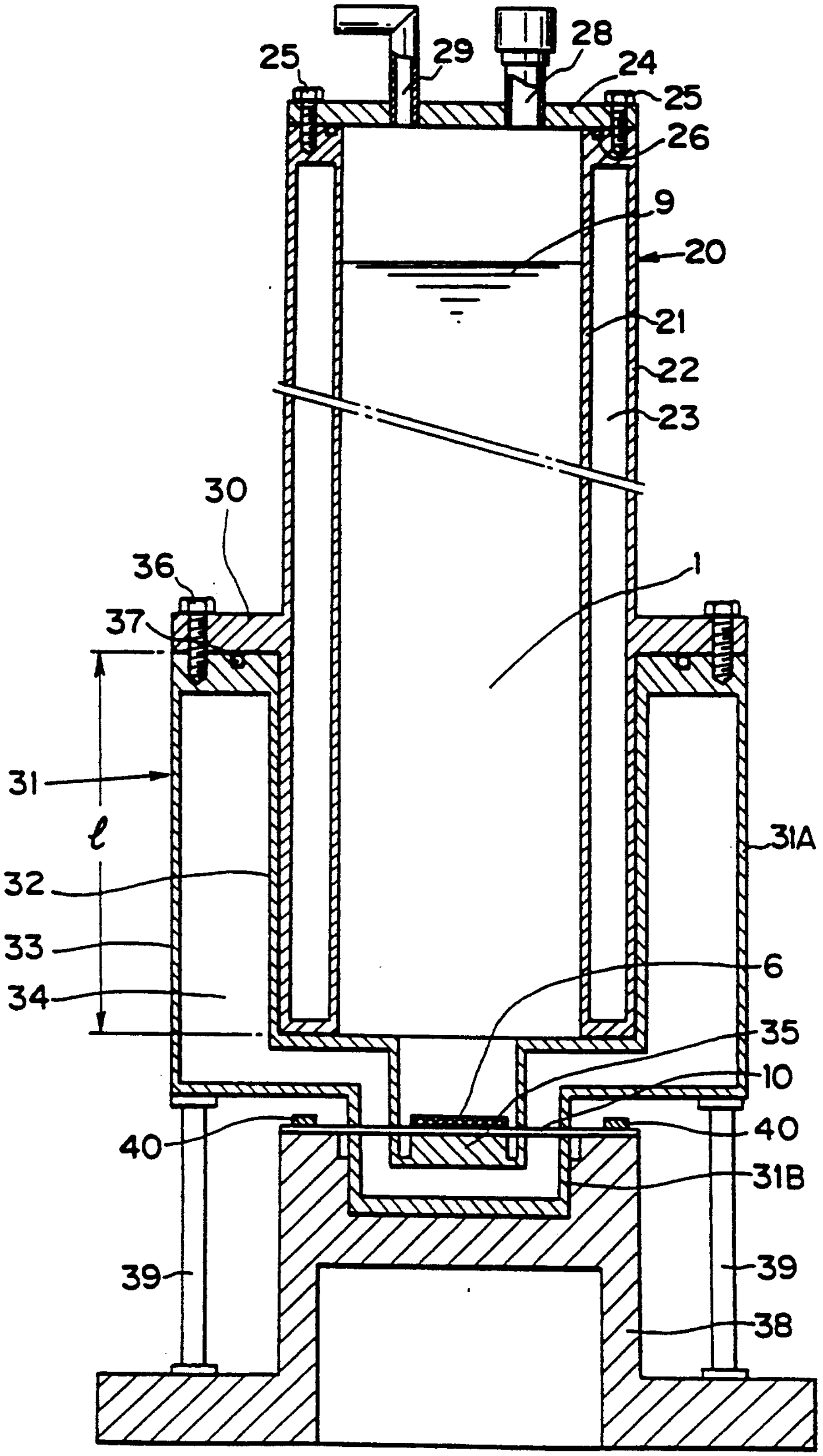
F I G. 5 PRIOR ART
FIG. 5 is an outlined diagram showing the immersion type cryostat proposed before the present invention.

In the example shown in FIG. 5, the construction is such that the cryostat is divided into the upper vessel 20 and the lower vessel 31 and the signal line 10 is passed through the inner wall 32 and the outer wall 33 of the lower vessel 31. However, the method according to the present invention is applicable not only to the case wherein the cryostat is divided into the upper and lower vessels but also all other cases wherein the signal line is led out passing through the FRP inner wall of the cryostat.

Figure 2:
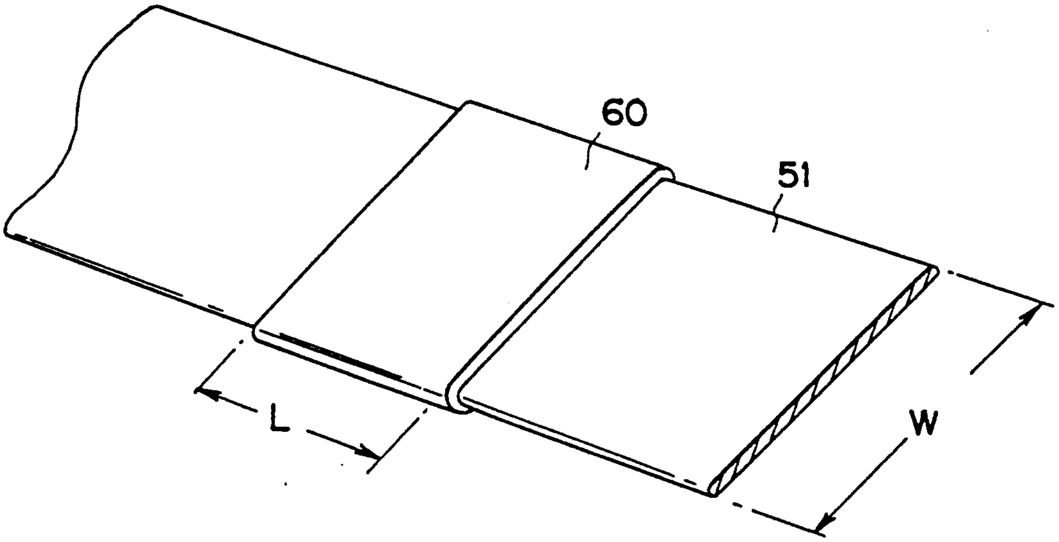
FIG. 2 is a perspective view of the example in FIG. 1.

For implementation of the method according to the present invention, the FRP layer 60 is formed on both wide surfaces of the specified position (including the part which will be later passed through the slit 50 of the inner wall 32 of the cryostat) of polyimide film cable 51 used as the signal line as shown in FIGS. 1 and 2. Though the materials to be used for the FRP layer 60 (fiber and resin) and the method for providing the FRP layer on the polyimide film cable are not limited, the formation and bonding of the FRP layer can be simultaneously carried out by impregnating glass cloth as fiber material with epoxy resin and bonding it to the surface of polyimide film cable or a material which is FRP-processed in advance can be bonded to the surface of polyimide film cable or further a semi-hardened prepreg can be bonded to the surface of polyimide film cable by heating under pressure and hardened at the same time. In these cases, glass fiber, carbon fiber and ceramic fiber can be used as fiber material (reinforcing material) for the FRP layer and epoxy resin and polyimide resin can be used as plastics material for the FRP layer.

The FRP layer 60 is formed, as shown in FIG. 1, so that the length L of polyimide film cable 51 in the longitudinal direction is sufficiently larger than the thickness T of inner wall 32 of the cryostat. Precisely, the length L is preferably more than three times the thickness T of inner wall 32. The thickness T of the inner wall of an FRP cryostat which are generally used is approximately 3 mm, minimum, while the length L of the FRP layer is approximately 13 to 15 mm as appropriate. The width W of polyimide film cable is generally approximately 50 mm in most cases, depending on the number of conductors of the cable.

Figure 3:
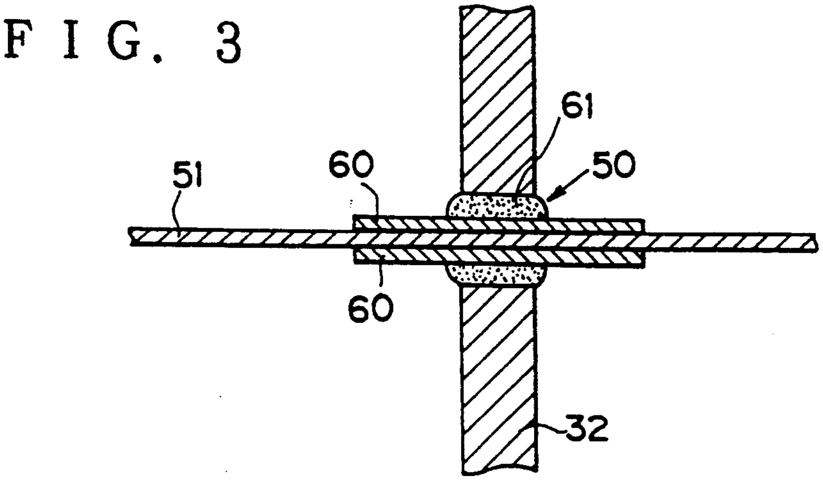
FIG. 3 is a vertical sectional view showing the bonding part including the polyimide film cable which is passed through the inner wall according to the method of the present invention.
Figure 4:
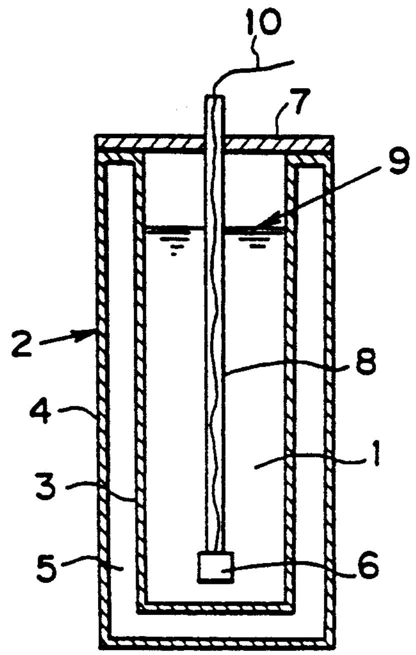
FIG. 4 PRIOR ART
FIG. 4 is an outlined diagram showing the conventionally typical immersion type cryostat.
Figure 6:
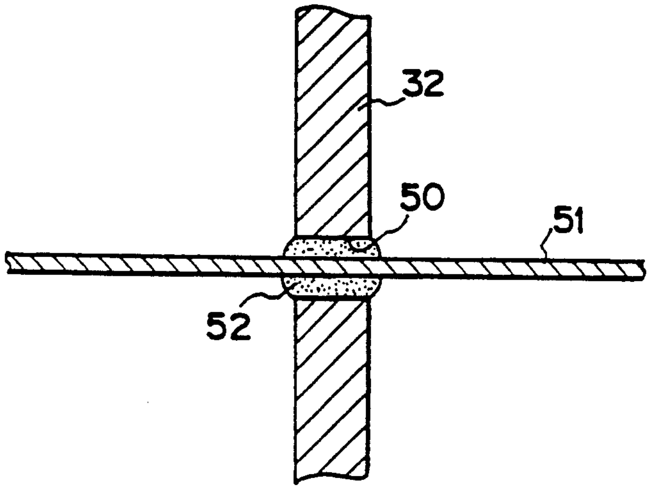
FIG. 6 PRIOR ART
FIG. 6 is a vertical sectional view showing the conventional method for passing and bonding the cable.
Figure 7:
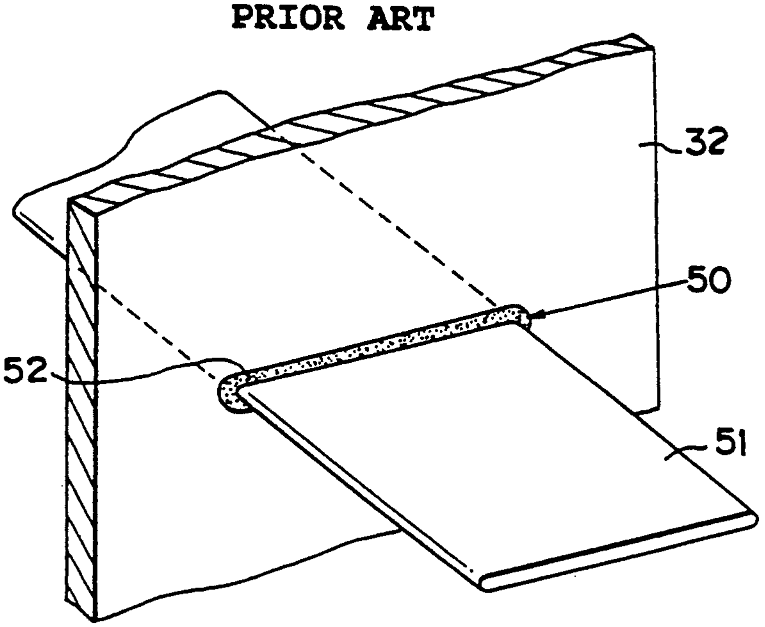
FIG. 7 PRIOR ART
FIG. 7 is a perspective view of FIG. 6.

After the FRP layer is formed on the polyimide film cable as described above, the polyimide film cable 51 is passed through the slit 50 provided at the inner wall 32 of the cryostat as shown in FIG. 3 and positioned so that a portion of the part of polyimide film cable on which the FRP layer 60 is formed is located within the slit 50. Under this condition, a clearance between the FRP layer 60 and the internal surface of slit 50 is filled and sealed with adhesive 61 such as epoxy resin as shown in FIG. 3 and the FRP layer 60 is bonded to the internal surface of slit 50. Thus, the polyimide film cable 51 is bonded and sealed into the slit 50 of inner wall 32 of the cryostat with the FRP layer 60 and the adhesive 61.

Part of the polyimide film cable as the signal line which is passed through the outer wall of the cryostat can be arbitrarily constructed since the temperature at this part is approximately room temperature, (differing from the part which is passed through the inner wall and the polyimide film cable) can be directly bonded and sealed with epoxy adhesive or the like as in the conventional method. Likewise, the part which is passed through the slit of the inner wall, the FRP layer can be formed on the polyimide film cable and the part on which the FRP layer is formed can be passed through the slit of the outer wall and bonded and sealed. In this case, the FRP layer can be continuously formed so that both parts which are passed through the inner and outer walls are integrally continued.

A comparison experiment as described below was conducted as to the case of the method according to the present invention and the case of the conventional method.

A slit with the opening dimensions of 43 mm×0.5 mm was formed in a 3 mm thick FRP plate assuming the inner wall of the cryostat and a polyimide film cable of 40 mm in width and 0.1 mm in thickness was passed through and bonded to the slit in the following two methods. The FRP plate is made of glass fiber and epoxy resin and equivalent to the FRP specified as G10 in NEMA.

The first method in accordance with the present invention was such that an FRP tape of 0.1 mm in thickness was bonded in advance to both surfaces of the polyimide film cable along the length of 13 mm with epoxy adhesive and this cable was passed through the slit and the surface of the FRP tape was bonded to the internal surface of the slit with the epoxy adhesive, then simultaneously the slit was sealed. An FRP tape made of epoxy resin and glass fibers was used.

The second method, that is, the conventional method, was such that the polyimide film cable to which the FRP layer was not adhered was passed through the slit and directly bonded to the slit with epoxy resin, then simultaneously the slit was sealed.

The following thermal cycle tests and the vacuum leak tests were conducted for each five specimens obtained by these two methods.

Precisely, after several thermal cycles between liquid nitrogen temperature and room temperature, one surface of the specimen was exposed to the atmospheric air and the other surface was evacuated to investigate the vacuum leak at the cable sealing part. The results are as shown in Table 1.

TABLE 1

| | | Number of thermal cycles*1) | | | | |
|---|---|---|---|---|---|---|
| | | 0 | 3 | 10 | 20 | 30 |
| FRP tape provided | A | ○ | ○ | ○ | ○ | ○ |
| | B | ○ | ○ | ○ | ○ | ○ |
| | C | ○ | ○ | ○ | ○ | ○ |
| | D | ○ | ○ | ○ | ○ | ○ |
| | E | ○ | ○ | ○ | ○ | ○ |
| FRP tape not provided | F | ○ | X | — | — | — |
| | G | ○ | X | — | — | — |
| | H | ○ | ○ | X | — | — |
| | I | ○ | ○ | X | — | — |
| | J | ○ | X | — | — | — |

*1)Number of thermal cycles between liquid nitrogen temperature and room temperature
○: No leak was found in the vacuum leak test after thermal cycles as many times as specified above.
X: Leak was found in the vacuum leak test.
—: No test was conducted.

As shown in Table 1, in the case that the cable using the FRP tape was passed through and bonded to the slit by the method in accordance with the present invention, no vacuum leak was found on all five specimens even after 30 thermal cycles. On the contrary, in the case wherein the FRP tape was not used, the vacuum leak occurred in ten or less thermal cycles. In the latter case, the vacuum leak resulted from cracks at the sealed part within ten cycles.

According to the method specified by the present invention, before passing and bonding the polyimide film cable through the slit of the FRP inner wall of the cryostat in which the slit is exposed to a particularly cryogenic liquid and cooled to a cryogenic temperature, the FRP layer is formed on the polyimide film cable along a distance longer than the thickness of the inner wall (i.e. the passing length through the inner wall), the polyimide film cable with the FRP layer is passed through the slit of the inner wall, and the FRP layer and the internal surface of the slit of the inner wall are bonded and sealed with adhesive. Thus, a sufficient bonding strength of the polyimide film cable to the inner wall (slit) can be obtained. Therefore, the vacuum leak at the bonded and sealed part could be prevented and the service life of the bonded and sealed part could be further extended than in the conventional method.

We claim:

1. In a cryostat in which a vacuum thermal insulation space is formed between an inner wall and an outer wall of a vessel body which is made to have a double-wall construction, at least the inner wall being made of FRP material and an inside of the inner wall being used to form a cryogenic liquid vessel, and a specimen holder for holding a specimen, which is kept exposed to cryogenic liquid, is provided at a lower part of the cryogenic liquid vessel, a method for passing a flat polyimide film cable, as a signal line which is led out from the specimen holder via the inner and outer walls, through the inner wall and bonding it to a portion of said inner wall through which said cable passes, comprises the steps of:

forming a slit for passing the polyimide film cable in the inner wall, forming an FRP layer along a distance longer than the thickness of the inner wall on both wide surfaces of the polyimide film cable, passing the polyimide film cable through the slit and positioning part of FRP layer in the slit along the polyimide film cable, and, subsequently, bonding and sealing the internal surface of the slit and the FRP layer with adhesive.

2. A method for passing and bonding a cable in a cryostat in accordance with claim 1, wherein the FRP layer is formed on both side surfaces of said polyimide film cable along a distance at least three times longer than the thickness of the inner wall of the cryostat.

3. A method for passing and bonding a cable in a cryostat in accordance with claim 1, wherein one of glass fiber, carbon fiber and ceramic fiber is selected and used as a reinforcing fiber for said FRP layer.

4. A method for passing and bonding a cable in a cryostat in accordance with claim 1, wherein one of epoxy resin and polyimide resin is selected and used as a resin material for said FRP layer.

5. A method for passing and bonding a cable in a cryostat in accordance with claim 1, wherein said adhesive is an epoxy.

* * * * *